United States Patent
Cui et al.

(10) Patent No.: US 11,384,185 B1
(45) Date of Patent: Jul. 12, 2022

(54) PREPARATION METHOD FOR FUMARIC ACID POUR POINT DEPRESSANT FOR CRUDE OIL

(71) Applicants: DESHI ENERGY TECHNOLOGY GROUP CO., LTD., Dongying (CN); SHANDONG DESHI CHEMICAL COMPANY LIMITED, Dongying (CN)

(72) Inventors: Shizhang Cui, Dongying (CN); Zongming Xiu, Dongying (CN); Liming Wang, Dongying (CN); Xinwang Song, Dongying (CN); Ruimei Gao, Dongying (CN); Yunfu Hou, Dongying (CN); Zhifeng Lv, Dongying (CN)

(73) Assignees: DESHI ENERGY TECHNOLOGY GROUP CO., LTD., Dongying (CN); SHANDONG DESHI CHEMICAL COMPANY LIMITED, Dongying (CN)

( * ) Notice: Subject to any disclaimer, the term of this patent is extended or adjusted under 35 U.S.C. 154(b) by 0 days.

(21) Appl. No.: 17/578,490

(22) Filed: Jan. 19, 2022

(30) Foreign Application Priority Data

Jun. 16, 2021 (CN) .......................... 202110663260.7

(51) Int. Cl.
| | |
|---|---|
| *C08F 218/08* | (2006.01) |
| *C10G 75/00* | (2006.01) |
| *C08F 216/04* | (2006.01) |
| *C08F 220/56* | (2006.01) |
| *C10M 145/08* | (2006.01) |
| *C08F 216/12* | (2006.01) |
| *C08F 226/10* | (2006.01) |
| *C10L 1/22* | (2006.01) |

(52) U.S. Cl.
CPC .......... *C08F 218/08* (2013.01); *C08F 216/04* (2013.01); *C08F 216/12* (2013.01); *C08F 220/56* (2013.01); *C08F 226/10* (2013.01); *C10G 75/00* (2013.01); *C10M 145/08* (2013.01); *C10G 2300/304* (2013.01); *C10L 1/22* (2013.01)

(58) Field of Classification Search
CPC .... C08F 218/08; C08F 216/04; C08F 216/12; C08F 220/56; C08F 220/10; C10G 75/00; C10G 2300/304; C10M 145/08; C10L 1/22
USPC .......................................................... 526/87
See application file for complete search history.

(56) References Cited

U.S. PATENT DOCUMENTS

| | | | | | |
|---|---|---|---|---|---|
| 3,661,541 | A | * | 5/1972 | Hollyday, Jr. .......... | C10L 1/146 44/459 |
| 6,583,247 | B1 | * | 6/2003 | Alvarino ............... | C10L 1/1963 526/323.2 |
| 9,518,244 | B2 | * | 12/2016 | Bloch ................ | C10M 169/041 |

FOREIGN PATENT DOCUMENTS

| | | | | |
|---|---|---|---|---|
| CN | 102952233 | A | * | 3/2013 |
| CN | 102952233 | A | | 3/2013 |
| CN | 106084128 | A | * | 11/2016 |
| CN | 106084128 | A | | 11/2016 |
| EP | 1171491 | A1 | | 1/2002 |
| WO | WO-0055222 | A1 | * | 9/2000 ............ C10L 1/1963 |

OTHER PUBLICATIONS

GB/T 510-2018, Determination of solidification point for petroleum products, 2018, pp. 1-5, State Administration for Market Regulation; Standardization Administration of the People's Republic of China.
GB/T 261-2021, Determination of flash point—Pensky-Martens closed cup method, 2021, pp. 1-16, State Administration for Market Regulation; Standardization Administration of the People's Republic of China.

* cited by examiner

*Primary Examiner* — Michael M. Bernshteyn
(74) *Attorney, Agent, or Firm* — Bayramoglu Law Offices LLC

(57) ABSTRACT

A fumaric acid pour point depressant for crude oil and a preparation method therefor are provided. The fumaric acid pour point depressant is obtained by polymerizing a first prepolymer, a second prepolymer, a third monomer and a fourth monomer, where the first prepolymer is obtained by pre-polymerizing vinyl acetate and a first monomer; and the second prepolymer is obtained by pre-polymerizing fumaric acid and a second monomer.

5 Claims, No Drawings

PREPARATION METHOD FOR FUMARIC ACID POUR POINT DEPRESSANT FOR CRUDE OIL

CROSS REFERENCE TO THE RELATED APPLICATIONS

This application is based upon and claims priority to Chinese Patent Application No. 202110663260.7, filed on Jun. 16, 2021, the entire contents of which are incorporated herein by reference.

TECHNICAL FIELD

The present application relates to a preparation method for a fumaric acid pour point depressant for crude oil, belonging to the technical field of crude oil condensation point reducing.

BACKGROUND

With the increasingly mature oil and gas exploitation technology, and increased oil and gas exploitation quantity, the safe and efficient transportation issues of oil and gas energy get more and more attention. However, petroleum crude oil is a complex multi-component hydrocarbon mixture containing paraffin. Especially, crude oil exploited in China has a higher paraffin content; the paraffin content in some crude oil can be up to 40% or above. Paraffin in crude oil is easily separated out to form wax crystals at a low temperature; and the wax crystals will form a three-dimensional network structure after being up to a certain content, thereby leading to poor crude oil mobility and even loss of mobility. To solve such a technical problem, heating transportation is always adopted during crude oil transportation, but the method consumes too much energy; the overall transportation will be shut down once a certain portion cannot be heated normally in transportation, which thus is not suitable for wide-range application.

In terms of the problem of improving crude oil transportation, the simplest and most effective method is to add a certain amount of chemical pour point depressant to crude oil. The chemical pour point depressant can effectively inhibit the precipitation of wax crystals in crude oil and prevent wax crystals from forming a three-dimensional network structure, thus reducing the condensation point of crude oil, such that crude oil also can keep mobility at a low temperature, thereby transporting crude oil at room temperature.

At present, the production capacity of crude oil will be improved by fracturing, acidification and other ways in crude oil exploitation; saline water and acid liquor are most frequently used in fracturing and acidification, thus increasing the acid and salt content of an exploitation region. Moreover, some crude oil exploitation regions have complex stratum conditions, resulting in varied condensation point and viscosity reduction effects of the existing pour point depressants from different crude oil exploitation regions. The cause of the problem lies in poor acid and salt tolerances of the existing pour point depressants. When the exploitation stratum contains higher content of acid and salt, the pour point depressant cannot come into play.

SUMMARY

To solve the above problem, provided is a fumaric acid pour point depressant for crude oil, and a preparation method therefor. The pour point depressant prepared by the preparation method can solve the technical problems of poor acid and salt tolerances of the existing pour point depressants, and can achieve higher condensation point and viscosity reduction effects in acid/salt-containing crude oil with a lower amount.

According to one aspect of the present application, provided is a preparation method for a fumaric acid pour point depressant for crude oil, including the following steps:

pre-polymerizing vinyl acetate and a first monomer having a weight ratio of (1-10):1 to obtain a first prepolymer with a degree of polymerization of 20-40;

pre-polymerizing fumaric acid and a second monomer having a weight ratio of (10-50):1 to obtain a second prepolymer with a degree of polymerization of 18-50; and adding a third monomer to the second prepolymer, performing esterification for no more than 1 h, then adding the first prepolymer and a fourth monomer, and performing polymerization for at least 3 h to obtain the fumaric acid pour point depressant for crude oil;

the first monomer is any one or more of N-vinylpyrrolidone, 2-(N-methacryloyloxy)ethylpyrrolidone, and 2-(N-acryloyloxy)ethylpyrrolidone; the second monomer is any one or more of allyl alcohol polyether, allyl polyether and diallyl polyether; the third monomer is a plurality of alcohols having a carbon number of 14-22; and the fourth monomer is any one or more of N,N-methylenebisacrylamide, acrylamide and N-hydroxymethyl)acrylamide.

Optionally, the first prepolymer, the second prepolymer, the third monomer and the fourth monomer have a weight ratio of (5-25):(10-80):(5-20):(2-25);

preferably, the first prepolymer, the second prepolymer, the third monomer and the fourth monomer have a weight ratio of 10:50:15:10.

Optionally, the first monomer is a mixture of N-vinylpyrrolidone and 2-(N-acryloyloxy)ethylpyrrolidone; and the N-vinylpyrrolidone and the 2-(N-acryloyloxy)ethylpyrrolidone have a weight ratio of (1-6):1;

optionally, the vinyl acetate and the first monomer have a weight ratio of 4:1;

preferably, the N-vinylpyrrolidone and the 2-(N-acryloyloxy)ethylpyrrolidone have a weight ratio of 3:1.

Optionally, the second monomer is a mixture of allyl polyether and allyl alcohol polyether; and the allyl polyether and the allyl alcohol polyether have a weight ratio of 1:(10-35);

optionally, the fumaric acid and the second monomer have a weight ratio of 24:1;

optionally, the allyl polyether and the allyl alcohol polyether have a weight ratio of 1:20;

more preferably, the allyl polyether is any one or more of allyl polyoxyethylene methyl ether, allyl polyoxyethylene propyl ether, allyl polyoxyethylene epoxy ether, allyl polyoxyethylene acetate, and allyl polyoxyethylene polyoxypropylene acetate;

the allyl alcohol polyether is allyl alcohol polyoxyethylene ether and allyl alcohol polyoxypropylene ether.

Optionally, the third monomer is a mixture of tetradecanol, hexadecanol, octadecanol and eicosanol; and the tetradecanol, the hexadecanol, the octadecanol and the eicosanol have a weight ratio of (1-10):1:(1-5):(1-5);

preferably, the tetradecanol, the hexadecanol, the octadecanol and the eicosanol have a weight ratio of 5:1:3:3.

Optionally, the fourth monomer is a mixture of acrylamide and N-(hydroxymethyl)acrylamide; and the acrylamide and the N-(hydroxymethyl)acrylamide have a weight ratio of (1-15):1;

preferably, the acrylamide and the N-(hydroxymethyl) acrylamide have a weight ratio of 9:1.

Optionally, a vinyl acetate monomer, the first monomer, and an initiator are dissolved into a solvent and stirred evenly, nitrogen is introduced, and the mixture is heated to 60-75° C. for a reaction for 1-5 h to obtain the first prepolymer;

in terms of parts by weight, the monomers have a total content of 33-70%, the initiator has a content of 0.2-1.0%, and the balance is the solvent;

preferably, the temperature is raised to 60-70° C. for a reaction for 2-4 h to obtain the first prepolymer;

more preferably, the temperature is raised to 65° C. for a reaction for 3 h to obtain the first prepolymer.

Optionally, fumaric acid, the second monomer, a mutual solvent and an initiator are dissolved into a solvent and stirred evenly, nitrogen is introduced, and the mixture is heated to 50-70° C. for a reaction for 1-7 h to obtain the second prepolymer;

in terms of parts by weight, the monomers have a total content of 40-55%, the mutual solvent has a content of 5-20%, the initiator has a content of 0.2-1.0%, and the balance is the solvent;

preferably, the temperature is raised to 50-60° C. for a reaction for 1-5 h to obtain the second prepolymer;

more preferably, the temperature is raised to 55° C. for a reaction for 4 h to obtain the second prepolymer.

Optionally, the third monomer and a catalyst are added to the second prepolymer for a reaction for 0.5-1 h at 80-110° C., then the first prepolymer, the fourth monomer and a chain transfer agent are added, and the reaction is continued to be carried out for 3-8 h to obtain the fumaric acid pour point depressant for crude oil;

in terms of parts by weight, the catalyst has a content of 0.2-1.0% and the chain transfer agent has a content of 0.01-0.05%;

preferably, the third monomer and an initiator are added to the second prepolymer for a reaction for 0.5-1 h at 80-90° C., then the first prepolymer, the fourth monomer and a chain transfer agent are added, and the reaction is continued to be carried out for 3-6 h to obtain the fumaric acid pour point depressant for crude oil;

more preferably, the third monomer and an initiator are added to the second prepolymer for a reaction for 1 h at 85° C., then the first prepolymer, the fourth monomer and a chain transfer agent are added, and the reaction is continued to be carried out for 4 h to obtain the fumaric acid pour point depressant for crude oil.

Optionally, the initiator is any one or more of azo, peroxosulfuric acid or peroxy initiators;

the catalyst is any one or more of phosphoric acid, boric acid, sulfonic acid, methylbenzenesulfonic acid, hydrochloric acid, hydrochloride, sulfuric acid, and sulphate;

the mutual solvent is any one or more of ethylene glycol monobutyl ether, dimethylformamide, and dimethyl sulfoxide;

the solvent is any one or more of hexane, monofluoromethane, difluoromethane, trifluoromethane, carbon tetrafluoride, benzene, methylbenzene, dimethylbenzene, diethyl ether, formaldehyde, and acetone; and the chain transfer agent is sodium formate.

According to another aspect of the present application, provided is a fumaric acid pour point depressant for crude oil; the pour point depressant is prepared by any one of the above preparation methods.

Beneficial effects of the present application include but are not limited to:

1. The preparation method for the fumaric acid pour point depressant for crude oil according to the present application has simple operation, low toxicity of raw materials and easily stored products. The synthetic process is divided into three steps; first and second prepolymers are synthesized first, and then final polymerization is performed; the obtained pour point depressant has high molecular weight and good condensation point and viscosity reduction effects.

2. A smaller amount of the pour point depressant prepared according to the present application is added to crude oil to decrease the condensation point and viscosity of the crude oil, thus avoiding environmental pollution; the pour point depressant is used in crude oil transportation to reduce the condensation point of the crude oil, improve the production efficiency, save the cost and expand the transportation volume.

3. The pour point depressant prepared according to the present application has polar groups and non-polar groups in molecules, where, the non-polar groups can produce cocrystallization effects with paraffin in crude oil, thus preventing the wax crystals from forming a three-dimensional network structure; the polar groups can prevent the growth of the wax crystals by means of molecular polarity to avoid the aggregation of the wax crystals, thus reducing the condensation point and viscosity of the crude oil.

4. According to the pour point depressant prepared in the present application, the ester group contained in vinyl acetate in the first prepolymer can exert dispersion effects on the wax crystals to prevent the aggregation of the wax crystals in crude oil, such that the wax crystals are dispersed into the crude oil in small granules, not easily forming the three-dimensional network structure, thus reducing the condensation point of the crude oil. The pyrrolidone group contained in the first monomer can enhance the rigidity of molecular chains, such that the molecular chains are arranged more regularly; the molecular chains of the pour point depressant can be adsorbed on the surface of the wax crystals when interacting with the wax crystals, thereby inhibiting the growth of the wax crystals.

5. According to the pour point depressant prepared in the present application, fumaric acid in the second prepolymer is a major reactive monomer and plays a role as a polymer skeleton; moreover, fumaric acid monomers are water-soluble monomers and can bind to crude oil well and can stabilize the properties of the pour point depressant. Long-chain side groups in polyether in the second monomer can form hydrophobic association in crude oil to improve the acid and salt resistances of the pour point depressant, such that the pour point depressant can also effectively reduce the condensation point and viscosity in crude oil with high acid and salt content. In crude oil transportation, due to the hydrophobic association, the crude oil can have the characteristic of shear thinning and the hydrophobic association can enhance the absorption of the pour point depressant on the surfaces of the wax crystals to disperse the wax crystals, thereby effectively reducing the condensation point of the crude oil.

6. According to the pour point depressant prepared in the present application, the third monomer reacts with a carboxy group of fumaric acid to generate an ester group and a long-chain side group; the ester group can exert a dispersing effect on the wax crystals to hinder the aggregation of wax crystals in crude oil; and the long-chain side group can serve as a hydrophobic group to improve the acid and salt resistances of the pour point depressant, and meanwhile can reduce the intermolecular hydrogen-bond interaction to decrease the affinity between the crude oil and a reservoir and a pipeline of an oil-gas field, thereby preventing the reservoir damage and pipeline blockage, and improving the yield and transportation volume.

7. According to the pour point depressant prepared in the present application, the fourth monomer contains a polar group; the polar group can improve the dispersibility of wax crystals and bind to other ester groups to enhance the adsorption capacity of the pour point depressant on the surfaces of the wax crystals, prevent the wax crystals from forming a three-dimensional network structure and reduce the condensation point and viscosity of crude oil. Meanwhile, the amino group can decrease the acting force between the crude oil and the reservoir and the pipeline, thus further decreasing the residual of the pour point depressant on the reservoir or pipeline wall and avoiding blocking.

8. According to the pour point depressant prepared in the present application, the interaction of vinyl acetate, fumaric acid, the first monomer, the second monomer, the third monomer and the fourth monomer can improve the acid and salt resistances of the pour point depressant. Moreover, raw materials selected for each monomer and ratios thereof and the ratios of the first prepolymer to the second prepolymer to the third monomer to the fourth monomer can ensure the acid and salt resistances of the pour point depressant while performing efficient polymerization on the polymers, such that the pour point depressant can also come into play in crude oil with a higher acid or salt content, thus effectively reducing the condensation point and viscosity of the crude oil.

DETAILED DESCRIPTION OF THE EMBODIMENTS

The present application will be described in detail in combination with the examples hereafter, but the present application is not limited to these examples.

Unless otherwise specified, raw materials and auxiliaries in the examples of the present application can be commercially purchased.

An analysis method in the examples of the present application is as follows:

the obtained pour point depressant was dissolved into crude oil for viscosity and condensation point measurement. A crude oil sample has a condensation point of 33° C., a paraffin content of 23%, a colloidal asphaltene content of 10-15%, and a viscosity of 800-1200 mPa·s. Specific operation was as follows: 0.1 wt % of the pour point depressant was added to 99.9 wt % of crude oil at 60° C. to be stirred for 20 min, then the stirred material was cooled to room temperature, and sampling was performed for testing. The condensation point of each crude oil in which the pour point depressant was added was detected in accordance with the standards of GB/T510-1983; the viscosity was obtained by testing the crude oil containing the pour point depressant at 60° C.; and the flash point was tested by reference to the regulations of GB/T 261.

A Fourier transform infrared spectrometer was used for infrared spectroscopic analysis of the pour point depressant; and the obtained pour point depressant was subjected to test analysis by an attenuated total reflection mode at room temperature.

Example 1

(1) 400.0 g of vinyl acetate, 75.0 g of N-vinylpyrrolidone and 25.0 g of 2-(N-acryloyloxy)ethylpyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer;

(2) 480.0 g of fumaric acid, 0.9 g of allyl polyoxyethylene acetate, and 19.1 g of allyl alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and (3) 500.0 g of the second prepolymer was weighed and heated to 85° C., then 62.5 g of tetradecanol, 12.5 g of hexadecanol, 37.5 g of octadecanol, 37.5 g of eicosanol and 2.5 g of phosphoric acid were added, uniform stirring was performed, and a reaction was carried out for 1 h; and afterwards, 100.0 g of the first prepolymer, 90.0 g of acrylamide, 10.0 g of N-(hydroxymethyl)acrylamide and 0.3 g of sodium methoxide were added, and the reaction was continued to be carried out under stirring for 4 h to obtain a fumaric acid pour point depressant 1# for crude oil.

Example 2

(1) 300.0 g of vinyl acetate, 15.0 g of N-vinylpyrrolidone and 15.0 g of 2-(N-acryloyloxy)ethylpyrrolidinone were respectively weighed and dissolved into 668.0 g of ethanol, then nitrogen was introduced, the mixture was heated to 60° C., 2.0 g of azodiisobutyronitrile was added, uniform stirring was performed, and a reaction was carried out for 5 h to obtain a first prepolymer; and steps (2) and (3) were the same as those in Example 1 to prepare a pour point depressant 2#.

Example 3

350.0 g of vinyl acetate, 300.0 g of N-vinylpyrrolidone and 50.0 g of 2-(N-acryloyloxy)ethylpyrrolidinone were respectively weighed and dissolved into 290.0 g of ethanol, then nitrogen was introduced, the mixture was heated to 75° C., 10.0 g of azodiisobutyronitrile was added, uniform stirring was performed, and a reaction was carried out for 1 h to obtain a first prepolymer; and steps (2) and (3) were the same as those in Example 1 to prepare a pour point depressant 3#.

Example 4

Step (1) was the Same as that in Example 1;

(2) 363.6 g of fumaric acid, 3.3 g of allyl polyoxyethylene acetate, and 33.1 g of allyl alcohol polyoxyethylene ether were respectively weighed and dissolved into 200.0 g of dimethyl sulfoxide and 398.0 g of deionized water, then nitrogen was introduced, the mixture was heated to 50° C., 2.0 g potassium persulfate was added, uniform stirring was performed, and a reaction was carried out for 7 h to obtain a second prepolymer; and step (3) was the same as that in Example 1 to prepare a pour point depressant 4#.

Example 5 step (1) was the same as that in example 1;

(2) 539.2 g of fumaric acid, 0.3 g of allyl polyoxyethylene acetate, and 10.5 g of allyl alcohol polyoxyethylene ether were respectively weighed and dissolved into 50.0 g of dimethyl sulfoxide and 390.0 g of deionized water, then nitrogen was introduced, the mixture was heated to 70° C., 10.0 g of potassium persulfate was added, uniform stirring was performed, and a reaction was carried out for 1 h to obtain a second prepolymer; and step (3) was the same as that in Example 1 to prepare a pour point depressant 5#.

Example 6 step (1) was the same as that in Example 1;
(2) 480.0 g of fumaric acid, 1.0 g of allyl polyoxyethylene acetate, and 19.0 g of allyl alcohol polyoxyethylene ether were respectively weighed and dissolved into 100.0 g of dimethyl sulfoxide and 395.0 g of deionized water, then nitrogen was introduced, the mixture was heated to 60° C., 5.0 g of potassium persulfate was added, uniform stirring was performed, and a reaction was carried out for 5 h to obtain a second prepolymer; and step (3) was the same as that in Example 1 to prepare a pour point depressant 6#.

Example 7

Steps (1) and (2) were the same as those in Example 1; and
(3) 100.0 g of the second prepolymer was weighed and heated to 90° C., then 10.0 g of tetradecanol, 10.0 g of hexadecanol, 30.0 g of octadecanol, 50.0 g of eicosanol and 1.0 g of phosphoric acid were added, uniform stirring was performed, and a reaction was carried out for 0.5 h; and afterwards, 50.0 g of the first prepolymer, 125.0 g of acrylamide, 125.0 g of N-(hydroxymethyl)acrylamide and 0.1 g sodium methoxide were added, and the reaction was continued to be carried out under stirring for 8 h to obtain a pour point depressant 7#.

Example 8

Steps (1) and (2) were the same as those in Example 1; and
(3) 100.0 g of the second prepolymer was weighed and heated to 110° C., then 100.0 g of tetradecanol, 10.0 g of hexadecanol, 50.0 g of octadecanol, 40.0 g of eicosanol and 8.0 g of phosphoric acid were added, uniform stirring was performed, and a reaction was carried out for 1 h; and afterwards, 250.0 g of the first prepolymer, 234.4 g of acrylamide, 15.6 g of N-(hydroxymethyl)acrylamide and 0.4 g of sodium methoxide were added, and the reaction was continued to be carried out under stirring for 3 h to obtain a pour point depressant 8#.

Example 9

Steps (1) and (2) were the same as those in Example 1; and
(3) 800.0 g of the second prepolymer was weighed and heated to 80° C., then 20.0 g of tetradecanol, 10.0 g of hexadecanol, 10.0 g of octadecanol, 10.0 g of eicosanol and 2.8 g of phosphoric acid were added, uniform stirring was performed, and a reaction was carried out for 1 h; and afterwards, 50.0 g of the first prepolymer, 18.0 g of acrylamide, 2.0 g of N-(hydroxymethyl)acrylamide and 0.3 g of sodium methoxide were added, and the reaction was continued to be carried out under stirring for 4 h to obtain a pour point depressant 9#.

Comparative Example 1

Comparative Example 1 differs from Example 1 in that the N-vinylpyrrolidone and the 2-(N-acryloyloxy)ethylpyrrolidone in the first monomer of the step (1) have a weight ratio of 9:1. Specific steps were as follows:

(1) 400.0 g of vinyl acetate, 90.0 g of N-vinylpyrrolidone and 10.0 g of 2-(N-acryloyloxy)ethylpyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer; and steps (2) and (3) were the same as those in Example 1 to prepare a pour point depressant D1#.

Comparative Example 2

Comparative Example 2 differs from Example 1 in that the N-vinylpyrrolidone and the 2-(N-acryloyloxy)ethylpyrrolidone in the first monomer of the step (1) have a weight ratio of 1:2. Specific steps were as follows:

(1) 400.0 g of vinyl acetate, 33.3 g of N-vinylpyrrolidone and 66.7 g of 2-(N-acryloyloxy)ethylpyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer; and steps (2) and (3) were the same as those in Example 1 to prepare a pour point depressant D2#.

Comparative Example 3

Comparative Example 3 differs from Example 1 in that the vinyl acetate and the first monomer in the step (1) have a weight ratio of 15:1. Specific steps were as follows:

(1) 468.8 g of vinyl acetate, 23.4 g of N-vinyl pyrrolidone and 7.8 g of 2-(N-acryloyloxy)ethyl pyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer; and steps (2) and (3) were the same as those in Example 1 to prepare a pour point depressant D3#.

Comparative Example 4

Comparative Example 4 differs from Example 1 in that the vinyl acetate and the first monomer in the step (1) have a weight ratio of 0.6:1. Specific steps were as follows:

(1) 187.5 g of vinyl acetate, 234.4 g of N-vinylpyrrolidone and 78.1 g of 2-(N-acryloyloxy)ethylpyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer; and steps (2) and (3) were the same as those in Example 1 to prepare a pour point depressant D4#.

Comparative Example 5

Comparative Example 5 differs from Example 1 in that the reaction temperature in the step (1) was 50° C. Specific steps were as follows:

(1) 400.0 g of vinyl acetate, 75.0 g of N-vinylpyrrolidone and 25.0 g of 2-(N-acryloyloxy)ethyl pyrrolidinone were respectively weighed and dissolved into 495.0 g of ethanol, then nitrogen was introduced, the mixture was heated to 50° C., 5.0 g of azodiisobutyronitrile was added, uniform stirring was performed, and a reaction was carried out for 3 h to obtain a first prepolymer; and steps (2) and (3) were the same as those in Example 1 to prepare a pour point depressant D5#.

Comparative Example 6

Comparative Example 6 differs from Example 1 in that the reaction time after uniform stirring in the step (1) was 0.5 h. Specific steps were as follows:

(1) 400.0 g of vinyl acetate, 75.0 g of N-vinyl pyrrolidone and 25.0 g of 2-(N-acryloyloxy)ethyl pyrrolidinone were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 0.5 h to obtain a first prepolymer; and steps (2) and (3) were the same as those in Example 1 to prepare a pour point depressant D6#.

Comparative Example 7

Comparative Example 7 differs from Example 1 in that the allyl polyether and the allyl alcohol polyether in the step (2) have a weight ratio of 1:9. Specific steps were as follows:

Step (1) was the same as that in Example 1;

(2) 480.0 g of fumaric acid, 2.0 g of allyl polyoxyethylene acetate, and 18.0 g of allyl alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and step (3) was the same as that in Example 1 to prepare a pour point depressant D7#.

Comparative Example 8

Comparative Example 8 differs from Example 1 in that the allyl polyether and the allyl alcohol polyether in the step (2) have a weight ratio of 1:39. Specific steps were as follows:

Step (1) was the same as that in Example 1;

(2) 480.0 g of fumaric acid, 0.5 g of allyl polyoxyethylene acetate, and 19.5 g of allyl alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and step (3) was the same as that in Example 1 to prepare a pour point depressant D8#.

Comparative Example 9

Comparative Example 9 differs from Example 1 in that the fumaric acid and the second monomer in the step (2) have a weight ratio of 9:1. Specific steps are as follows:

Step (1) was the same as that in Example 1;

(2) 450.0 g of fumaric acid, 2.4 g of allyl polyoxyethylene acetate, and 47.6 g of allyl alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and step (3) was the same as that in Example 1 to prepare a pour point depressant D9#.

Comparative Example 10

Comparative Example 10 differs from Example 1 in that the fumaric acid and the second monomer in the step (2) have a weight ratio of 55:1. Specific steps were as follows:

step (1) was the same as that in Example 1;

(2) 491.1 g of fumaric acid, 0.4 g of allyl polyoxyethylene acetate, and 8.5 g of allyl alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and step (3) was the same as that in Example 1 to prepare a pour point depressant D10#.

Comparative Example 11

Comparative Example 11 differs from Example 1 in that the reaction temperature in the step (2) was 40° C. Specific steps were as follows:

step (1) was the same as that in Example 1;

(2) 480.0 g of fumaric acid, 0.9 g of ally polyoxyethylene acetate, and 19.1 g of ally alcohol polyoxyethylene ether were respectively weighed and dissolved into 100.0 g of dimethyl sulfoxide and 395.0 g of deionized water, then nitrogen was introduced, the mixture was heated to 40° C., 5.0 g of potassium persulfate was added, uniform stirring was performed, and a reaction was carried out for 4 h to obtain a second prepolymer; and step (3) was the same as that in Example 1 to prepare a pour point depressant D11#.

Comparative Example 12

Comparative Example 12 differs from Example 1 in that the reaction time after uniform stirring in the step (2) was 0.5 h. Specific steps were as follows:

step (1) was the same as that in Example 1;

(2) 480.0 g of fumaric acid, 0.9 g of ally polyoxyethylene acetate, and 19.1 g of ally alcohol polyoxyethylene ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 0.5 h to obtain a second prepolymer; and step (3) was the same as that in Example 1 to prepare a pour point depressant D12#.

Comparative Example 13

Comparative Example 13 differs from Example 1 in that the tetradecanol, hexadecanol, octadecanol and the eicosanol in the third monomer in the step (3) have a weight ratio of 12:1:1:1. Specific steps were as follows:
steps (1) and (2) were the same as those in Example 1; and
(3) 500.0 g of the second prepolymer were weighed and heated to 85° C., then 120.0 g of tetradecanol, 10.0 g of hexadecanol, 10.0 g of octadecanol, 10.0 g of eicosanol and 2.5 g of phosphoric acid were added, uniform stirring was performed and a reaction was carried out for 1 h; and afterwards, 100.0 g of the first prepolymer, 90.0 g of acrylamide, 10.0 g of N-(hydroxymethyl)acrylamide and 0.3 g of sodium methoxide were added, and the reaction was continued to be carried out under stirring for 4 h to obtain a pour point depressant D13#.

Comparative Example 14

Comparative Example 14 differs from Example 1 in that the acrylamide and the N-(hydroxymethyl)acrylamide in the fourth monomer in the step (3) have a weight ratio of 19:1. Specific steps were as follows:
steps (1) and (2) were the same as those in Example 1; and
(3) 500.0 g of the second prepolymer were weighed and heated to 85° C., then 62.5 g of tetradecanol, 12.5 g of hexadecanol, 37.5 g of octadecanol, 37.5 g of eicosanol and 2.5 g of phosphoric acid were added, uniform stirring was performed and a reaction was carried out for 1 h; and afterwards, 100.0 g of the first prepolymer, 95.0 g of acrylamide, 5.0 g of N-(hydroxymethyl)acrylamide and 0.3 g of sodium methoxide were added, and the reaction was continued to be carried out under stirring for 4 h to obtain a pour point depressant D14#.

Comparative Example 15

Comparative Example 15 differs from Example 1 in that the first prepolymer, the second prepolymer, the third monomer and the fourth monomer in the step (3) have a weight ratio of 1:50:15:1. Specific steps were as follows:
Steps (1) and (2) were the same as those in Example 1; and
(3) 500.0 g of the second prepolymer were weighed and heated to 85° C., then 62.5 g of tetradecanol, 12.5 g of hexadecanol, 37.5 g of octadecanol, 37.5 g of eicosanol and 2.0 g of phosphoric acid were added, uniform stirring was performed and a reaction was carried out for 1 h; and afterwards, 10.0 g of the first prepolymer, 9.0 g of acrylamide, 1.0 g of N-(hydroxymethyl)acrylamide and 0.2 g of sodium methoxide were added, and the reaction was continued to be carried out under stirring for 4 h to obtain a pour point depressant D15#.

Comparative Example 16

Comparative Example 16 differs from Example 1 in that the first prepolymer and the third monomer in the step (3) was subjected to a reaction at 70° C. Specific steps were as follows:
Steps (1) and (2) were the same as those in Example 1; and
(3) 500.0 g of the second prepolymer were weighed and heated to 70° C., then 62.5 g of tetradecanol, 12.5 g of hexadecanol, 37.5 g of octadecanol, 37.5 g of eicosanol and 2.5 g of phosphoric acid were added, uniform stirring was performed and a reaction was carried out for 1 h; and afterwards, 100.0 g of the first prepolymer, 90.0 g of acrylamide, 10.0 g of N-(hydroxymethyl)acrylamide and 0.3 g of sodium methoxide were added, and the reaction was continued to be carried out under stirring for 4 h to obtain a pour point depressant D16#.

Comparative Example 17

Comparative Example 17 differs from Example 1 in that the reaction was carried out under stirring for 2 h after the first prepolymer and the fourth monomer were added in the step (3). Specific steps were as follows:
steps (1) and (2) were the same as those in Example 1; and
(3) 500.0 g of the second prepolymer were weighed and heated to 85° C., then 62.5 g of tetradecanol, 12.5 g of hexadecanol, 37.5 g of octadecanol, 37.5 g of eicosanol and 2.5 g of phosphoric acid were added, uniform stirring was performed and a reaction was carried out for 1 h; and afterwards, 100.0 g of first prepolymer, 90.0 g of acrylamide, 10.0 g of N-(hydroxymethyl) acrylamide and 0.3 g of sodium methoxide were added, and the reaction was continued to be carried out under stirring for 2 h to obtain a pour point depressant D17#.

Comparative Example 18

Comparative Example 18 differs from Example 1 in that the first monomer in the step (1) was replaced by ethylene. Specific steps were as follows:
400.0 g of vinyl acetate, and 100.0 g of ethylene were respectively weighed and dissolved into 495.0 g of ethanol, then nitrogen was introduced, the mixture was heated to 65° C., 5.0 g of azodiisobutyronitrile was added, uniform stirring was performed, and a reaction was carried out for 3 h to obtain a first prepolymer; and
steps (2) and (3) were the same as those in Example 1 to prepare a pour point depressant D18#.

Comparative Example 19

Comparative Example 19 differs from Example 1 in that the second monomer in the step (2) was replaced by vinyl isobutyl ether. Specific steps were as follows:
step (1) was the same as that in Example 1;
(2) 480.0 g of fumaric acid, and 20.0 g of vinyl isobutyl ether were respectively weighed and dissolved into 100.0 g of dimethyl sulfoxide and 395.0 g of deionized water, then nitrogen was introduced, the mixture was heated to 55° C., 5.0 g of potassium persulfate was added, uniform stirring was performed, and a reaction was carried out for 4 h to obtain a second prepolymer; and
step (3) was the same as that in Example 1 to prepare a pour point depressant D19#.

Comparative Example 20

Comparative Example 20 differs from Example 1 in that the third monomer in the step (3) was replaced by butanol. Specific steps were as follows:
steps (1) and (2) were the same as those in Example 1; and
(3) 500.0 g of the second prepolymer were weighed and heated to 85° C., then 150.0 g of butanol, and 2.5 g of phosphoric acid were added, uniform stirring was performed and a reaction was carried out for 1 h; and afterwards, 100.0 g of the first prepolymer, 90.0 g of acrylamide, 10.0 g of N-(hydroxymethyl)acrylamide and 0.3 g of sodium methoxide were added, and the reaction was continued to be carried out under stirring for 4 h to obtain a pour point depressant D20#.

Comparative Example 21

Comparative Example 21 differs from Example 1 in that the fourth monomer in the step (3) was replaced by vinyl cyclohexane. Specific steps were as follows:
steps (1) and (2) were the same as those in Example 1; and
(3) 500.0 g of the second prepolymer were weighed and heated to 85° C., then 62.5 g of tetradecanol, 12.5 g of hexadecanol, 37.5 g of octadecanol, 37.5 g of eicosanol and 2.5 g of phosphoric acid were added, uniform stirring was performed and a reaction was carried out for 1 h; and afterwards, 100.0 g of the first prepolymer, 100.0 g of vinyl cyclohexane, and 0.3 g of sodium methoxide were added, and the reaction was continued to be carried out under stirring for 4 h to obtain a pour point depressant D21#.

Comparative Example 22

Comparative Example 22 differs from Example 1 in that all the monomers and auxiliaries are polymerized together. Specific steps were as follows:
40.0 g of vinyl acetate, 7.5 g of N-vinylpyrrolidone, and 2.5 g of 2-(N-acryloyloxy)ethylpyrrolidinone were respectively weighed and dissolved into 49.5 g of ethanol, then 5.0 g of azodiisobutyronitrile was added, and uniform stirring was performed to obtain a first component; 240.0 g of fumaric acid, 0.5 g of allyl polyoxyethylene acetate, and 9.5 g of allyl alcohol polyoxyethylene ether were weighed and dissolved into 50.0 g of dimethyl sulfoxide and 197.5 g of deionized water, then 2.5 g of potassium persulfate was added, and uniform stirring was performed to obtain a second component; and the second component was heated to 85° C., then nitrogen was introduced, the first component, 62.5 g of tetradecanol, 12.5 g of hexadecanol, 37.5 g of octadecanol, 37.5 g of eicosanol and 2.5 g of phosphoric acid were added, uniform stirring was performed and a reaction was carried out for 1 h; and afterwards, 90.0 g of acrylamide, 10.0 g of N-(hydroxymethyl)acrylamide and 0.3 g of sodium methoxide were added, and the reaction was continued to be carried out under stirring for 4 h to obtain a pour point depressant D22#.

0.1 wt % of the pour point depressant obtained in each example and comparative example was added to 0# crude oil for processing. Test results are shown in Table 1.

TABLE 1

| Sample No. | Condensation point (° C.) | Decreasing amplitude (° C.) | Flash point (° C.) | Viscosity (mPa · s) |
| --- | --- | --- | --- | --- |
| 1# | 15 | 18 | 30 | 69 |
| 2# | 19 | 14 | 27 | 103 |
| 3# | 18 | 15 | 29 | 81 |
| 4# | 19 | 14 | 25 | 112 |
| 5# | 18 | 15 | 24 | 124 |
| 6# | 17 | 16 | 25 | 115 |
| 7# | 19 | 14 | 23 | 98 |
| 8# | 18 | 15 | 26 | 120 |
| 9# | 19 | 14 | 24 | 117 |
| D1# | 21 | 12 | 19 | 262 |
| D2# | 23 | 10 | 20 | 284 |
| D3# | 22 | 11 | 18 | 345 |
| D4# | 24 | 9 | 22 | 371 |
| D5# | 22 | 11 | 20 | 310 |
| D6# | 20 | 13 | 21 | 302 |
| D7# | 25 | 8 | 19 | 390 |
| D8# | 21 | 12 | 23 | 375 |
| D9# | 22 | 11 | 22 | 296 |
| D10# | 24 | 9 | 21 | 386 |
| D11# | 21 | 12 | 24 | 273 |
| D12# | 24 | 9 | 19 | 364 |
| D13# | 25 | 8 | 20 | 359 |
| D14# | 23 | 10 | 20 | 370 |
| D15# | 26 | 7 | 21 | 410 |
| D16# | 22 | 11 | 22 | 386 |
| D17# | 24 | 9 | 23 | 361 |
| D18# | 25 | 8 | 22 | 427 |
| D19# | 28 | 5 | 20 | 458 |
| D20# | 29 | 4 | 18 | 439 |
| D21# | 27 | 6 | 19 | 450 |
| D22# | 27 | 6 | 17 | 473 |

It can be seen from the condensation point and viscosity test of 0.1 wt % of the pour point depressant obtained according to each example and comparative example in crude oil that on the whole, after being processed by each pour point depressant, crude oil has reduced condensation point and viscosity; pour point depressants 1#-9# will decrease the condensation point of the crude oil, wherein, after being processed by the pour point depressant 1#, the crude oil has the minimum condensation point, being up to 15° C. The above result indicates that the pour point depressant obtained by the present application can effectively prevent the wax crystals in crude oil from forming a three-dimensional network structure. Further, the pour point depressant of the present application can come into play in the crude oil transportation to reduce the condensation point of the crude oil, improve the production efficiency, save the cost and expand the transportation volume of the crude oil.

It can be seen from the test result of the pour point depressant in each comparative example in crude oil that monomers and synthesis conditions for the preparation of the pour point depressant will influence the condensation point reduction effect and rheological properties of the pour point depressant for crude oil; the pour point depressant synthesized in each comparative example has the condensation point reduction effect and rheological properties weaker than the pour point depressants of the examples.

What is described above are merely examples of the present application. The protection scope of the present application is not limited to these detailed examples, but determined by the claims of the present application. A person skilled in the art knows that the present application may have various changes and alterations. Any amendment, equivalent replacement, improvement and the like made within the technical idea and principle of the present application should be included within the protection scope of the present application.

The invention claimed is:
1. A preparation method for a fumaric acid pour point depressant for crude oil, comprising the following steps:
pre-polymerizing vinyl acetate and a first monomer having a weight ratio of (1-10):1 to obtain a first prepolymer with a degree of polymerization of 20-40;
pre-polymerizing fumaric acid and a second monomer having a weight ratio of (10-50):1 to obtain a second prepolymer with a degree of polymerization of 18-50; and
adding a third monomer to the second prepolymer, performing esterification for no more than 1 hour, then adding the first prepolymer and a fourth monomer, and performing polymerization for at least 3 hours to obtain the fumaric acid pour point depressant for crude oil;

the first prepolymer, the second prepolymer, the third monomer and the fourth monomer have a weight ratio of (5-25):(10-80):(5-20):(2-25);

the first monomer is a mixture of N-vinylpyrrolidone and 2-(N-acryloyloxy)ethylpyrrolidone; and the N-vinylpyrrolidone and the 2-(N-acryloyloxy)ethylpyrrolidone have a weight ratio of (1-6):1;

the second monomer is a mixture of allyl polyether and allyl alcohol polyether; and the allyl polyether and the allyl alcohol polyether have a weight ratio of 1:(10-35);

the third monomer is a mixture of tetradecanol, hexadecanol, octadecanol and eicosanol; and the tetradecanol, the hexadecanol, the octadecanol and the eicosanol have a weight ratio of (1-10):1:(1-5):(1-5);

the fourth monomer is a mixture of acrylamide and N-(hydroxymethyl)acrylamide; and the acrylamide and the N-(hydroxymethyl)acrylamide have a weight ratio of (1-15):1.

2. The preparation method according to claim 1, wherein a vinyl acetate monomer, the first monomer, and an initiator are dissolved into a solvent and stirred evenly to obtain a mixture solution, nitrogen is introduced, and the mixture solution is heated to 60-75° C. for a reaction for 1-5 hours to obtain the first prepolymer; and in terms of parts by weight, the monomers have a total content of 33-70%, the initiator has a content of 0.2-1.0%, and the balance is the solvent.

3. The preparation method according to claim 1, wherein fumaric acid, the second monomer, a mutual solvent and an initiator are dissolved into a solvent and stirred evenly to obtain a mixture solution, nitrogen is introduced, and the mixture solution is heated to 50-70° C. for a reaction for 1-7 hours to obtain the second prepolymer; and in terms of parts by weight, the monomers have a total content of 40-55%, the mutual solvent has a content of 5-20%, the initiator has a content of 0.2-1.0%, and the balance is the solvent.

4. The preparation method according to claim 1, wherein the third monomer and a catalyst are added to the second prepolymer for a reaction for 0.5-1 hour at 80-110° C., then the first prepolymer, the fourth monomer and a chain transfer agent are added, and the reaction is continued to be carried out for 3-8 hours to obtain the fumaric acid pour point depressant for crude oil; and in terms of parts by weight, the catalyst has a content of 0.2-1.0% and the chain transfer agent has a content of 0.01-0.05%.

5. A fumaric acid pour point depressant for crude oil, wherein the fumaric acid pour point depressant is prepared by the preparation method of claim 1.

* * * * *